United States Patent [19]

Eslambolchi et al.

[11] Patent Number: 5,754,285
[45] Date of Patent: May 19, 1998

[54] METHOD AND APPARATUS FOR REMOTELY TESTING OPTICAL FIBER SPLICES VIA OPTICAL TIME DOMAIN REFLECTOMETRY

[75] Inventors: Hossein Eslambolchi, Basking Ridge, N.J.; John Sinclair Huffman, McDonough, Ga.

[73] Assignee: AT&T Corp, Middletown, N.J.

[21] Appl. No.: 816,442

[22] Filed: Mar. 12, 1997

[51] Int. Cl.⁶ .................................................. G01N 21/59
[52] U.S. Cl. .................................................. 356/73.1
[58] Field of Search .................................................. 356/73.1

[56] References Cited

U.S. PATENT DOCUMENTS

| | | | |
|---|---|---|---|
| 5,442,434 | 8/1995 | Liao et al. | 356/73.1 |
| 5,452,075 | 9/1995 | Edwall | 356/73.1 |
| 5,455,672 | 10/1995 | Lamonde et al. | 356/73.1 |
| 5,552,881 | 9/1996 | Jezwinski et al. | 356/73.1 |

*Primary Examiner*—Vincent P. McGraw
*Attorney, Agent, or Firm*—Robert B. Levy

[57] ABSTRACT

Automatic measurement of the quality of each splice (17) in an optical fiber (12) is accomplished by a combination Automatic Time Domain Reflectometer and Optical Switch unit (18) situated at one of the fiber remote from the location (16) where the splice is made. Technicians at the splice location (16) control the combination Automatic Time Domain Reflectometer and Optical Switch unit (18) by launching commands thereto via a laptop computer (32) that are communicated across a wireless communication channel via a wireless transceiver (30). Fiber loss measurements made by the combination Automatic Time Domain Reflectometer and Optical Switch unit (18) are relayed to the technicians at the remote splice location across the wireless channel for processing on the computer (32) to determine the splice quality.

9 Claims, 1 Drawing Sheet

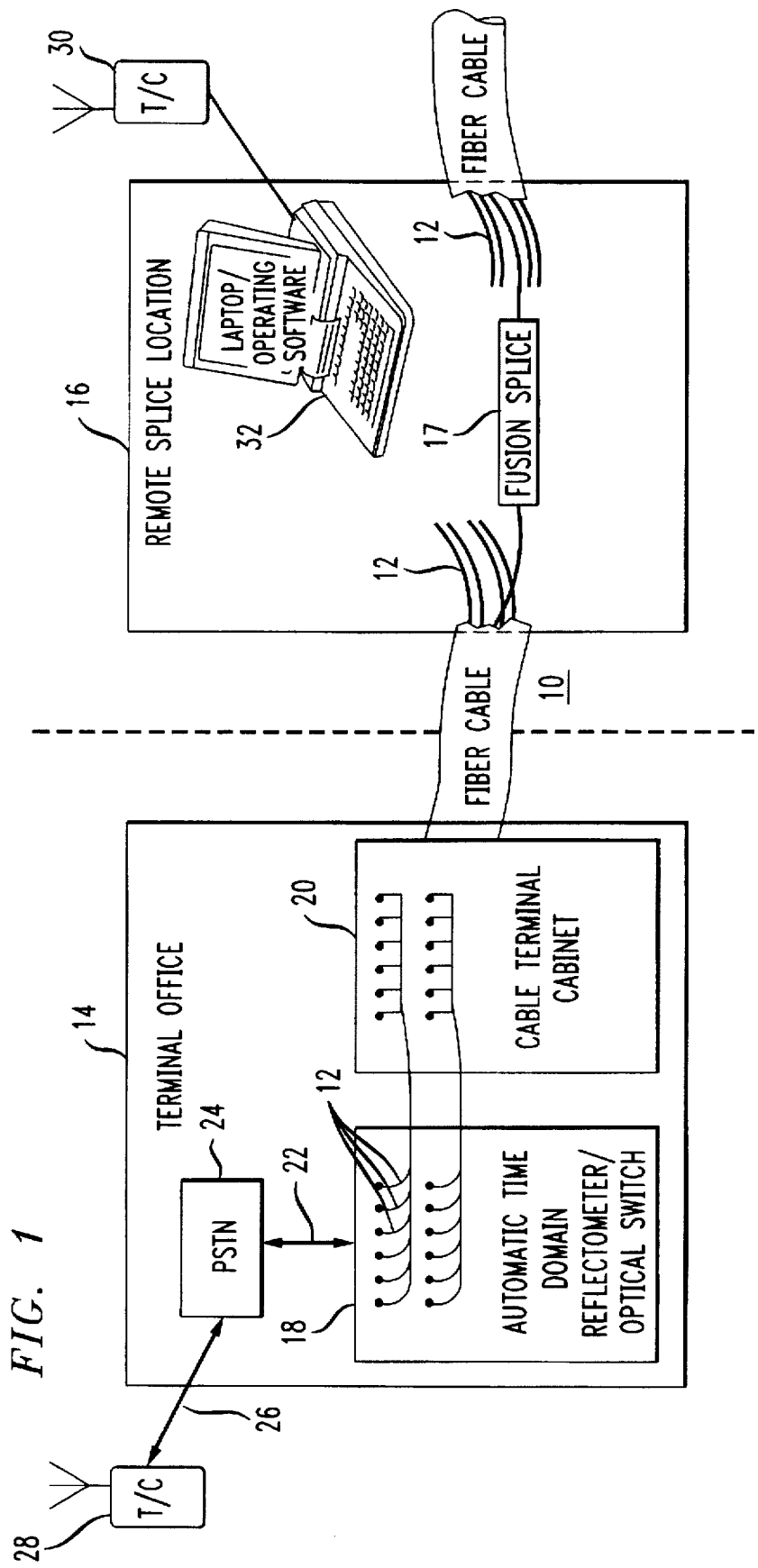

METHOD AND APPARATUS FOR REMOTELY TESTING OPTICAL FIBER SPLICES VIA OPTICAL TIME DOMAIN REFLECTOMETRY

TECHNICAL FIELD

This invention relates to a technique for measuring loss in a optical fiber remote from the fiber ends to test the quality of a splice made in the fiber.

BACKGROUND ART

Major providers of telecommunications services, such as AT&T, maintain large networks of optical fibers bundled within optical fiber cables. Occasionally, one or more of fibers within a cable must be spliced, especially if the cable is severed following accidental excavation along the cable right-of-way. While many different splicing techniques exist, fusion splicing is the technique of choice, especially within the AT&T network. Fusion splices are quick to make and are efficient in terms of maintaining a desired overall loss budget. In practice, fusion splices are made by aligning the fibers to be spliced by their outer diameters and then welding (fusing) the fibers together.

Over the entire length of an optical fiber, there may be several splices. To maintain a low loss budget (i.e., to achieve a low overall fiber loss), the technician(s) making each splice in the fiber usually test quality of the splice. Presently, technicians verify the quality of a splice by placing an Optical Time Domain Reflectometer (OTDR) at one end of the spliced fiber. The OTDR is a well-known device that determines fiber loss by directing a beam of light into the fiber and measuring the degree to which the light scatters. If the splice quality is good (i.e., the fiber loss is low), the amount of light scattered within the fiber is low in comparison to the light scattered when the splice is poor.

Presently, OTDR measurements are made manually by a technician at one of the ends of the fiber. The technician reads the OTDR measurement and then relays the results back to the technician(s) making the splice. Depending on the nature of the OTDR that is employed, and the ability of the technician to operate the device, the nature of the splice loss measurement tends to be subjective. Moreover, given the manual nature of the measurement, the number of measurements that can be made on each fiber is limited. As a result, the technician(s) making the splice may not necessarily have an accurate assessment of the quality of the splice. If many splices are required along a fiber, the fiber loss budget may be exceeded despite efforts to make high quality splices.

Thus, there is need for technique for remotely measuring the loss in an optical fiber to automatically determine the quality of a fiber splice.

BRIEF SUMMARY OF THE INVENTION

Briefly, in accordance with a preferred embodiment of the invention, a technique is provided for measuring the loss in an optical fiber automatically to establish the quality of an optical fiber splice. In accordance with the method, a combination Automatic Optical Time Domain Reflectometer and Optical Switch (AOTDR) is provided at one of the ends of the fiber being spliced. The AOTDR is controlled remotely, via a processor (e.g., a laptop computer) at the remote splice location in communication with the AOTDR, typically via cell phone or satellite. One or more technicians at the remote splice location send commands to AOTDR, and in response, the AOTDR selects a fiber for testing and then makes a plurality of loss measurements on the selected optical fiber quickly and automatically. Follow the measurements on the optical fiber, the AOTDR automatically communicates the results back to the laptop computer at the remote splice location. The laptop computer analyzes the loss information from the AOTDR to determine the optical fiber loss to provide an indication of the splice quality. Information regarding the quality of each splice is typically stored, either by the laptop computer, or elsewhere, for purposes of comparing test results for other splices. In this way, the splice technician(s) can obtain high quality splices.

BRIEF DESCRIPTION OF THE DRAWINGS

FIG. 1 illustrates a system, in accordance with the invention, for remotely testing a fiber splice.

DETAILED DESCRIPTION

FIG. 1 illustrates an optical fiber cable 10 that contains a plurality of fibers 12—12 for carrying optical signals from a first terminal office 14 to a second terminal office (not shown). On occasion, one or more of the fibers 12—12 within the cable 10 may become severed as a result of inadvertent excavation along the right-of way of the cable. To restore traffic, the severed fibers 12—12 are spliced at the location, referred to as the remote splice location 16, where the fibers are severed. While different techniques exist for making splices, it is preferable to splice a broken fiber via a fusion splice 17. Such a splice is made by first aligning the broken fiber segments via their outer diameters and then welding them together.

While great care is taken in making each fusion splice 17, errors can and do occur, resulting in increased loss within the optical fiber 12 which is undesirable. To reduce the incidence of error, fiber loss measurements are made after each splice. In the past, such measurements were made manually, by placing an OTDR at the terminal office 14. A technician at the terminal office manually made the fiber loss measurements via the OTDR and relayed the information about the measurement to the splice technician(s) at the remote splice location 16. Unfortunately, this approach depended on the ability of the technician at the terminal office 14 to operate the OTDR and interpret the results, making the measurement process somewhat subjective.

In accordance with the invention, loss measurements are made automatically in a rapid manner and are relayed electronically to the technician(s) at the remote splice location 16, greatly reducing the subjectivity of the loss measurement. To accomplish automatic fiber loss measurement, a combination Automatic Optical Time Domain Reflectometer and Optical Switch unit 18 (hereinafter referred to as an AOTDR) is provided at the terminal office 14. Each of the ports of the optical switch portion of the AOTDR 18 is connected to one of the fibers 12—12 in the cable 10 that terminate at a cabinet 20 in the terminal office 14. The optical switch portion of the AOTDR 18 has the capability of selectively coupling one of the fibers 12—12 to an automatic optical time domain reflectometer portion of the AOTDR 18 capable of automatically making loss measurements in a rapid manner. In this way, the automatic optical time domain reflectometer portion of the AOTDR 18 measures the loss on each selected fiber repeatedly, allowing a large number of measurements to be made rapidly and with high accuracy.

The AOTDR 18 is controlled in response to commands supplied via a phone line 22 coupling the AOTDR to a Public Switched Telephone Network (PSTN) 24 such as the PSTN maintained by AT&T. To control the AOTDR 18, a splice technician at the remote splice location 16 dials the number of the line 22 and establishes a connection through the PSTN 24. In response to a command entered from the splice technician via the phone line 22, the AOTDR 18 selects one of the fibers 12—12 connected to its optical switch portion for loss measurement testing. The automatic optical time domain reflectometer portion of the AOTDR 18 measures the fiber loss a preselected number of times, say 50, in a rapid manner and then communicates the results of each measurement via the phone link 22 to the PSTN 24 for receipt by the splice technician.

In the illustrated embodiment, a trunk 26 couples the PSTN 24 to a transceiver (T/C) 28 that may comprise part of a mobile telephone switching office (not shown) having the capability of sending and receiving wireless calls in a well known manner. In thus way, the T/C 28 can receive wireless commands for ultimate receipt by the AOTDR 18 and can relay the test results generated by the AOTDR. Note that the T/C 28 could alternatively comprise a satellite-type transceiver for sending and receiving calls to via a satellite (not shown)

To facilitate remote control the AOTDR 18, technicians at the remote splice location 16 utilize a transceiver (T/C) 30 to communicate with the T/C 28. For example, when T/C 28 takes the form of a mobile switching office for handling wireless calls or personal communications calls, the T/C 30 comprises a wireless phone or personal communications device, respectively, as are known in the art. Alternatively, the T/Cs 28 and 30 could both comprise satellite telephone terminals. The T/C 30 at the remote splice location 16 is linked to a processor 32, typically a portable or laptop computer as are well known in the art. The laptop computer 32 includes a communications software package, such as LapLink, for example, to facilitate a communication with the AOTDR 18, via the T/Cs 28 and 30 and the PSTN 24. Note that the AOTDR 18 could easily be connected to the laptop processor 32 via a wired link, rather than a wireless link as described. However, in practice, a wired link may not is usually unavailable at the remote splice location.

In operation, one of the splice technicians at the remote splice location 16 first establishes a wireless communications link between the AOTDR 18 and the laptop computer 32, via the T/Cs 28 and 30 and the PSTN 24. After establishing the communications link, the technician at the remote splice location 16 then enters commands, via the laptop computer 32, to cause the AOTDR 18 to select a particular one of the fibers 12—12 connected to it for testing. Thereafter, the AOTDR 18 tests the selected fiber a prescribed number of times and transmits the results of the test to the laptop computer 32. The laptop computer 32 processes the information, using one or more well known statistical analysis programs. For example, the laptop computer 32 analyzes loss data from the AOTDR 18 by determining the mean loss for the fiber 12 as well as the standard deviation. Such information may be stored by the laptop computer 32 for possible recall at a subsequent time to compare the loss data for different splices. Additionally, the laptop computer 32 can display the results, if desired Automatically measuring the fiber loss remotely in the manner described affords several advantages. First, the loss measurement technique of the invention obviates the need for a technician at the terminal office 14. Moreover, the technique obviates the subjectivity associated with manual measurements made in the past. Additionally, the technique affords the opportunity to automatically perform a large number of loss tests rapidly and to record the data for comparison purposes.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A method for automatically measuring the quality of an optical splice in a particular one of a plurality of fibers, comprising the steps of:

connecting a combination Automatic Time Domain Reflectometer and Optical Switch unit to one end of each of said plurality of fibers at least a particular one of which has at least one splice therein at a location remote from said one end;

launching a wireless command from a portable processor at said remote location to said combination Automatic Time Domain Reflectometer and Optical Switch unit to cause said unit to select said one particular fiber and to perform at least one loss measurement on said one fiber;

relaying from said combination Automatic Time Domain Reflectometer and Optical Switch unit to said portable processor at said remote location via a second wireless command said loss measurement; and entering the loss measurement into said portable processor which processes said measurement to determine the splice quality.

2. The method according to claim 1 wherein the command is launched via a cellular telephone.

3. The method according to claim 1 wherein the command is launched via a satellite telephone.

4. The method according to claim 1 wherein the loss measurement is relayed via a cellular telephone.

5. The method according to claim 1 wherein the loss measurement is relayed via a satellite telephone.

6. The method according to claim 1 wherein multiple loss measurements are made on said selected fiber.

7. A system for automatically measuring the quality of an optical splice in one of a plurality of fibers, comprising:

a combination Automatic Time Domain Reflectometer and Optical Switch unit coupled to one end of each of said plurality of fibers at least one of which has at least one splice therein at a location remote from said one end, and in response to a command launched thereto via a wireless communications channel, said combination Automatic Time Domain Reflectometer and Optical Switch unit selecting said one fiber, performing at least one loss measurement and relaying the results via said wireless communications channel to the remote splice location;

processor means at said remote splice location for launching a command to, and accepting for processing loss measurements results relayed from said combination Automatic Time Domain Reflectometer and Optical Switch unit; and transceiver means at the remote splice location and coupled to the processor means for transmitting to said combination Automatic Time Domain Reflectometer and Optical Switch unit on said wireless communication channel the command launched by said processor means and for receiving from said combination Automatic Time Domain Reflectometer and Optical Switch unit on said wireless communication channel the loss results.

8. The apparatus according to claim 7 wherein the transceiver means comprises a cellular telephone.

9. The apparatus according to claim 7 wherein the transceiver means comprises a satellite telephone.

* * * * *